Jan. 30, 1940.      R. C. MURPHY      2,188,815
GASKET
Filed July 31, 1937
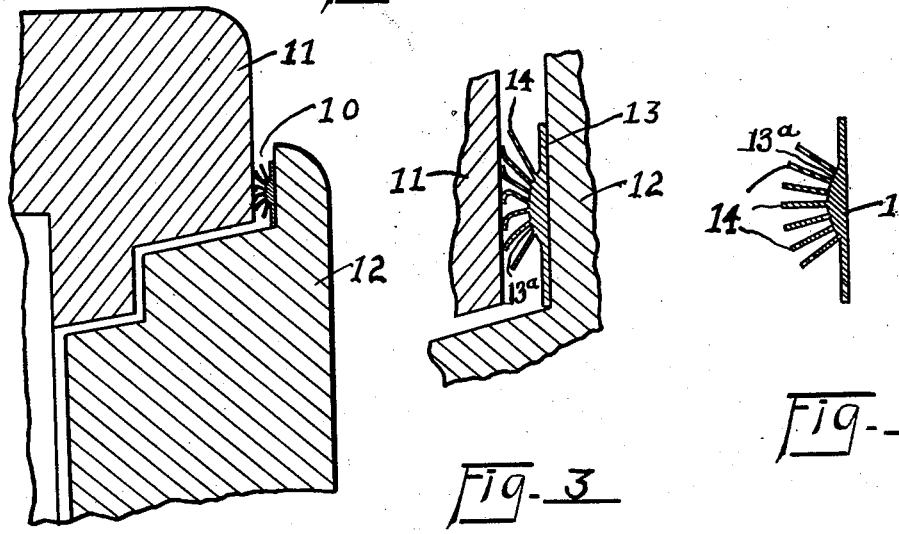
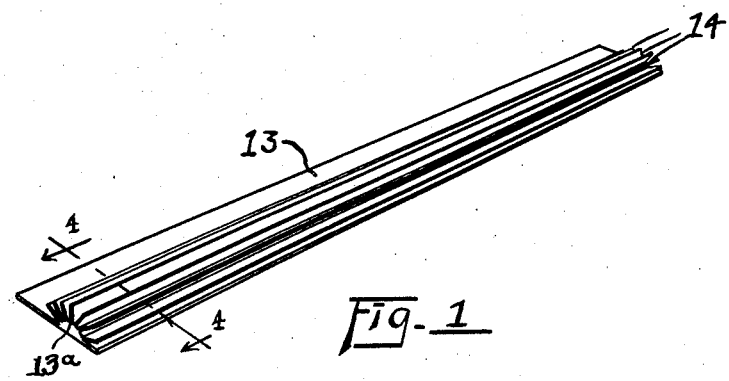
INVENTOR.
Roy C. Murphy
ATTORNEYS.

Patented Jan. 30, 1940

2,188,815

UNITED STATES PATENT OFFICE 2,188,815

GASKET

Roy C. Murphy, Grand Rapids, Mich., assignor to Corduroy Rubber Company, Grand Rapids, Mich., a corporation of Delaware Application July 31, 1937, Serial No. 156,623

2 Claims. (Cl. 20—69)

The present invention relates to gaskets and more particularly to gaskets especially adapted for use in conjunction with swinging closures such as refrigerator and motor car doors or casement windows and the like.

The primary objects of the instant invention are to provide gaskets of the general character above indicated which when installed adjacent the marginal edge of an opening, may be readily compressed during the closing movement of a swinging door hingedly mounted adjacent one length of the opening; to provide such a gasket which when thus installed in use is so readily compressed that little or no forcing against the fixed hinges of the door results during the initial and continuing contact of the hinge side of the door with the gasket during the swinging closing movement of the door; to provide such a gasket which when thus installed in use is adequate and efficient in sealing the marginal edges of an opening closed by a swinging door; to provide such a gasket which when installed in use seals the marginal edge of an opening closed by a swinging door on the principle of a squeegee action; and, to provide such a gasket which may be readily and conveniently installed in use, which is utilitarian and efficient in use and which is economical in manufacture.

An illustrative embodiment of the invention is shown in the accompanying drawing, wherein:

Figure 1 is a perspective plan view of a length of the novel type gasket;

Figure 2 is a sectional view showing the gasket installed adjacent the marginal edge of an opening closed by a swinging door;

Figure 3 is an enlarged sectional view similar to Figure 2; and

Figure 4 is a sectional view of the gasket on line 4—4 of Figure 1.

Referring then to the drawing wherein like parts of the gasket and the structure with which it is associated are designated by the same numerals in the several views, the opening 10 between a refrigerator 11 or the like and its swinging door 12 is sealed by the novel type gasket of the instant invention when the door is closed.

The gasket here shown comprises an elongated base portion 13 having a longitudinally extending convex surface 13a, preferably of rubber or some other resilient material, provided with a plurality of integrally formed longitudinally and disposed resilient ribs or fins 14 extending radially from the convex surface 13a of the base portion 13 of the gasket.

When installed adjacent the marginal edge of an opening closed by a swinging door, the ribs are caused to be compressed by the closing movement of the door as indicated in Figures 2 and 3. A squeegee action is thus effected during the initial and continuing closing movement of the door upon its hinges with the result that an efficient seal is produced with little or no forcing against the fixed hinges of the door to loosen the hinges over a period of time and in more or less constant use.

Since prior type gaskets used in like installations are conventionally provided with a tubular bead filled with air which must be evacuated with each closing movement of the swinging door, the gasket of the instant invention with its squeegee action is not only easier on the fixed hinges of the door because of the ready compressibility of its resilient fins but is likewise efficient in its sealing, may be conveniently installed in use and is economical in manufacture.

While but one specific embodiment of the invention has been herein shown and described, it will be understood that certain details of the construction shown may be altered or omitted without departing from the spirit of this invention as the same is defined by the following claims.

I claim:

1. A gasket having an elongated base portion provided with a longitudinally extending convex surface and with a plurality of longitudinally disposed resilient fins extending radially from said convex surface a sufficient distance to permit each fin to flex independently of the other fins and independently of said base portion.

2. A resilient gasket having an elongated base portion provided with a longitudinally extending convex surface and with a plurality of integrally formed longitudinally disposed resilient fins extending radially from said convex surface a sufficient distance to permit each fin to flex independently of the other fins and independently of said base portion.

ROY C. MURPHY.